Oct. 25, 1960 W. G. HANLEY 2,957,706
DUAL WHEEL STUB AXLE, SUPPORT STRUT AND BRAKE ASSEMBLY
Filed Aug. 13, 1957 4 Sheets-Sheet 1
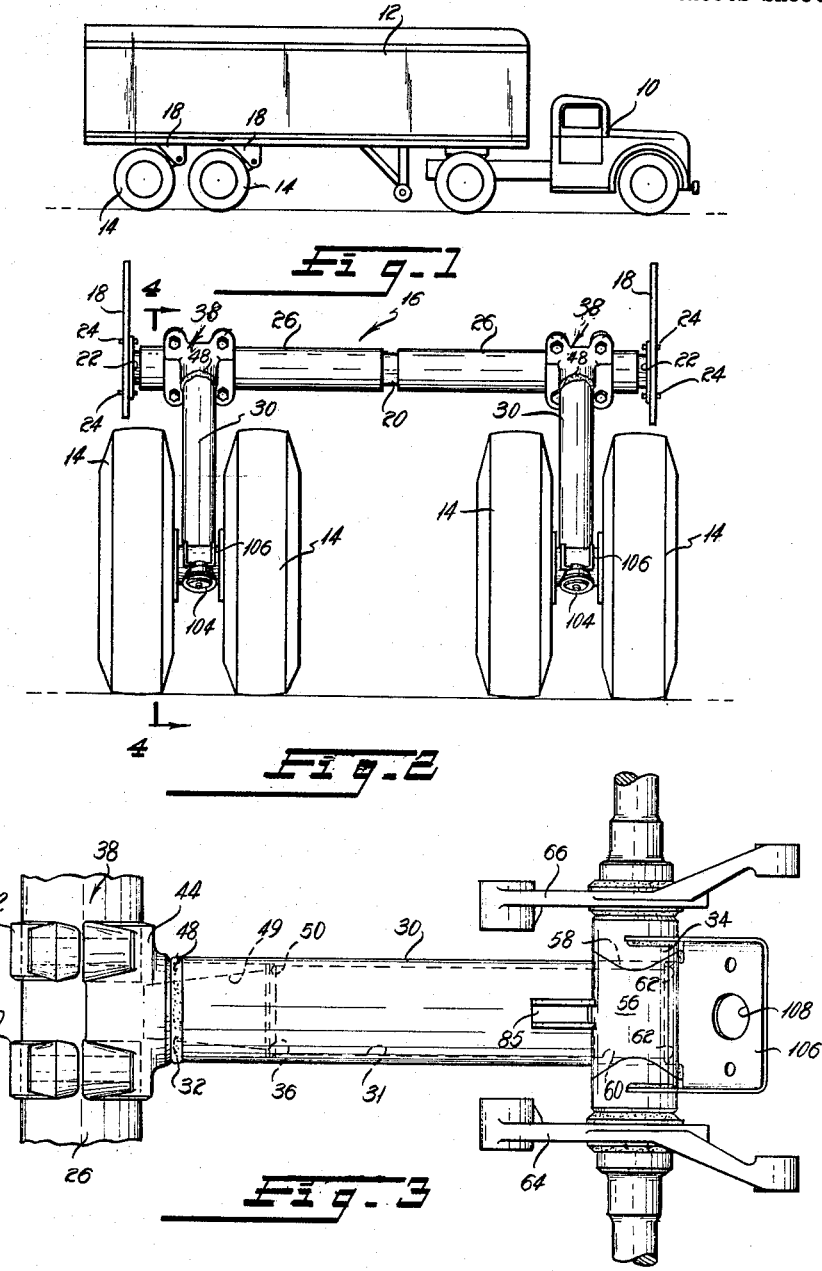
INVENTOR.
William G. Hanley
BY
Strauch, Nolan & Neale
ATTORNEYS

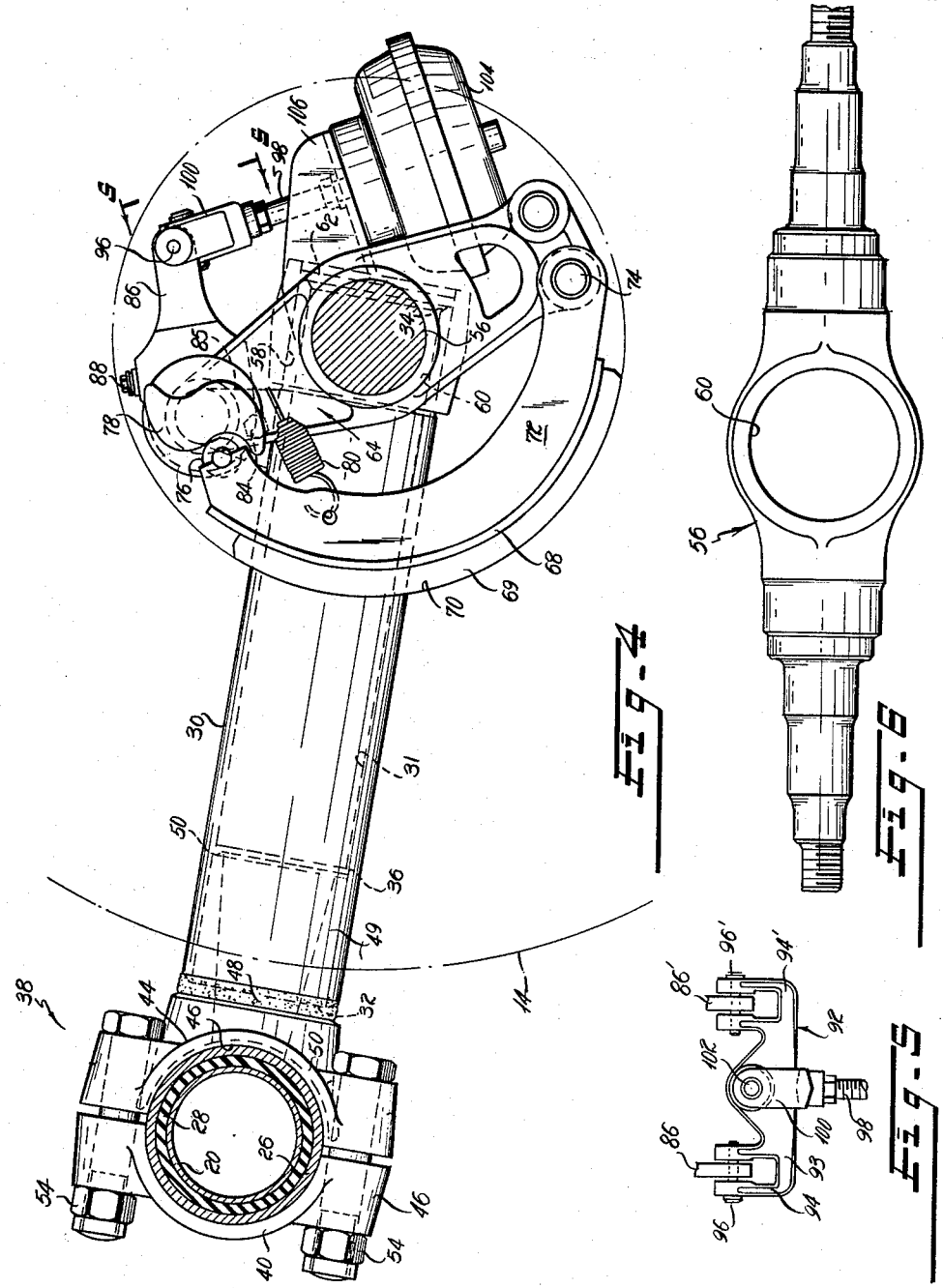

Oct. 25, 1960  W. G. HANLEY  2,957,706
DUAL WHEEL STUB AXLE, SUPPORT STRUT AND BRAKE ASSEMBLY
Filed Aug. 13, 1957  4 Sheets-Sheet 3

INVENTOR.
WILLIAM G. HANLEY
BY
ATTORNEYS

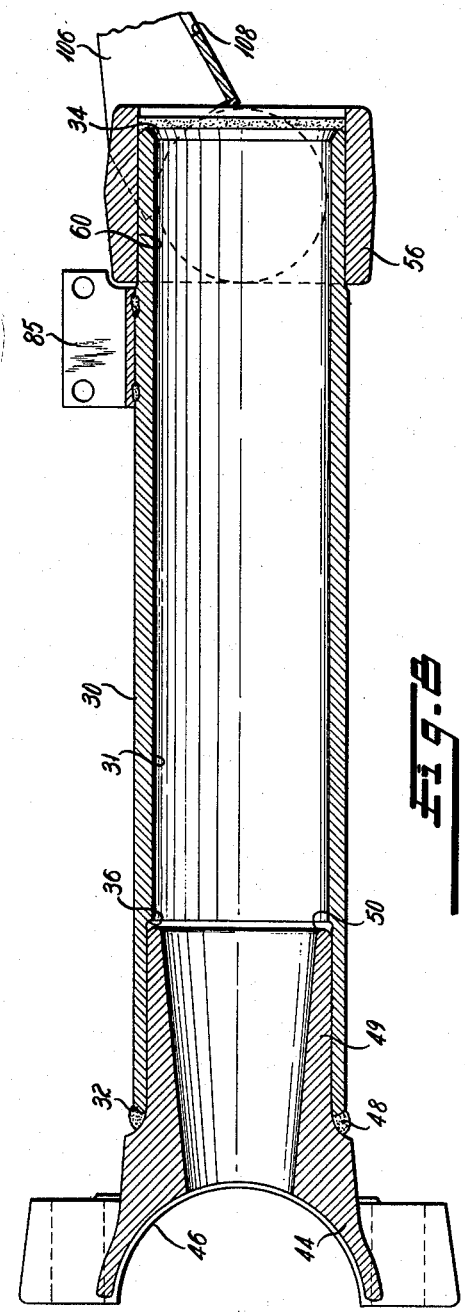

United States Patent Office 2,957,706
Patented Oct. 25, 1960

2,957,706

DUAL WHEEL STUB AXLE, SUPPORT STRUT, AND BRAKE ASSEMBLY

William G. Hanley, Kenton, Ohio, assignor to Rockwell-Standard Corporation, a corporation of Pennsylvania Filed Aug. 13, 1957, Ser. No. 678,001

9 Claims. (Cl. 280—124)

This invention relates to improved trailer rear wheel torsion spring strut suspension and braking assemblies particularly suited for dual rear wheel units of the type used on trailers in either single or tandem arrangements.

In some tractor-trailer combinations, a torsion spring strut suspension has been effectively substituted for the trailer's usual rear wheel coil or leaf spring suspension system. The strut members of these assemblies must be very strong and those heretofore used have been of solid construction with a part of the torsion bar mounting bracket formed integrally therewith. This has been found to be an expensive member to fabricate because of its one-piece heavy construction. Furthermore, such a strut lacks resilience through the section adjoining the mounting bracket where high shock or impact stresses are incurred even during normal operating conditions. These stresses often result in failure or substantial weakening of the strut member.

Another difficulty with prior dual wheel strut assemblies is that it has been the practice to provide a fluid motor brake actuator for each wheel. This required not only an expensive and complicated arrangement, but synchronizing the braking action on each wheel in an effort to obtain even and smooth stopping was difficult to achieve because of the number of brake motor actuators.

The primary object of this invention is to provide an improved vehicle rear wheel suspension and braking assembly of the torsion bar connected strut mounted axle type; the strut being of relatively light tubular construction and having greater resistance to shock loads than solid struts and the brakes providing an even, smooth, and uniform operation.

Another object of this invention is to provide a strut suspension and brake assembly in which welded connections between strut and torsion bar mounting bracket and strut and axle respectively provide a limited resilience which will absorb high shock impact loads.

A further object of this invention is to provide a simple braking assembly for a pair of ground engaging wheels mounted on the end of a strut, the assembly simultaneously and uniformly braking both wheels in response to a single motor actuator.

It is also an object of the present invention to provide in a trailer rear wheel torsion bar suspension system a novel and improved strut, stub axle, and brake spider arrangement as a sturdy but flexible, compact unit.

Another object of the present invention is the provision of a strut comprising a straight hollow tube part, one end of which is secured to the center section of a stub axle, the opposite end receiving a tubular extension of a semicircular seat member, and a separate cap part to cooperate with the semicircular seat to securely fasten the strut to the outer shell of the crosstube.

A more specific objec is the provision in the trailer suspension of stub axles in which an intermediate section is provided with a circular cutout transverse to the axle centerline to receive the strut end and form a rigid connection therewith.

A still further object is the provision of stub axles in trailer suspensions each having two brake spiders rigidly secured thereto adjacent the intermediate section.

Still another object is the provision in the trailer suspensions of a bracket secured to the intermediate section of the stub axle between both wheels onto which is secured a brake actuator to actuate both brake mechanisms simultaneously by means of a novel linkage system.

Further novel features and other objects of this invention will become apparent from the following detailed description, discussion and the appended claims taken in conjunction with the accompanying drawings showing preferred structures and embodiments, in which:

Figure 1 is a side elevation of a tractor-trailer of the type in which the suspension and braking assembly of this invention may be used;

Figure 3 is a top plan view of the strut, stub axle, and brake shoe supports, the brake shoe supports being shown rotated about 60° in a counterclockwise direction from their normal position in relation to the axle in order to illustrate their top plan configuration;

Figure 4 is a side elevation, partially in section, taken generally along the line 4—4 of Figure 2;

Figure 5 is an elevation of a link member and an actuating rod pivotally connected thereto looking in the direction of arrows 5—5 in Figure 4;

Figure 6 is a side elevation of the stub axle of this invention;

Figure 7 is a fragmentary rear elevation of the assembly of Figure 4 with parts broken away for clarity; and Figure 8 is a vertical longitudinal cross-section of the support strut connecting the stub axle to the torsion bar assembly.

Figure 2:
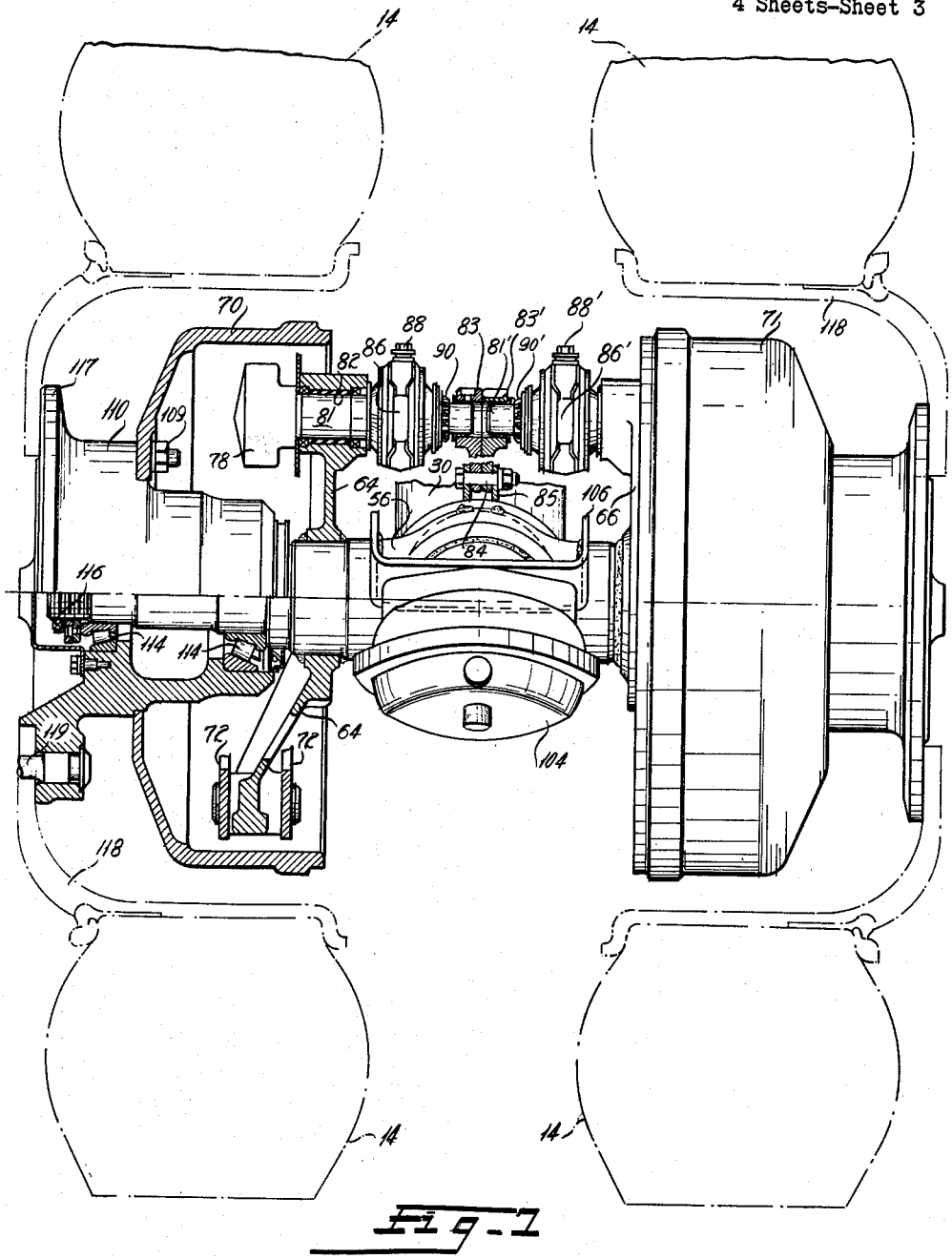
Figure 2 is a rear elevation of the suspension and braking assembly of this invention connected to a spring torsion bar.

Referring now more specifically to the drawings, there is illustrated in Figure 1 a tractor-trailer assembly comprising a tractor 10 supporting the front end of a trailer 12 having a tandem set of dual rear ground engaging wheels 14 mounted on torsion spring suspensions indicated generally at 16 connected to trailer frame brackets 18. The spring torsion bar assembly indicated generally at 16, details of which are shown in Figures 2 and 4, includes an inner tubular bar 20 having end flanges 22 rigidly connected to brackets 18 by a plurality of bolts 24. A pair of opposed axially spaced outer tubular mounting bars 26 are resiliently connected to the tubular bar 20 by a pair of rubber sleeves 28 concentric with and bonded to the outer surface of tubular bar 20 and the inside surface of tubular mounting bars 26, respectively. For a more detailed description of such a spring torsion bar assembly, reference may be had to United States Patent No. 2,773,699 issued December 11, 1956.

In Figures 3, 4 and 8 there is shown a tubular strut 30 having a through bore 31 and opposite chamfered ends 32 and 34. A section of bore 31 adjacent end 32 is enlarged to provide a shoulder 36. A strut mounting bracket assembly 38 for rigidly connecting strut 30 to a tubular mounting bar 26 comprises a pair of semi-circular cap members 40 and 42 opposite a base member 44 in which a semi-circular seat 46 is formed. The bracket assembly is welded at 48 to chamfered end 32 of strut 30 and has a tubular extension 49 which fits snugly in the enlarged section of bore 31 with a chamfered end 50 abutting against shoulder 36. As shown, the walls of tubular extension 49 are of progressively diminishing cross sectional thickness toward chamfered end 50. The tapering tubular extension 49 together with weld 48 provides a strong connection between strut 30 and bracket 38 which has sufficient resilience to absorb severe shock loads and impacts without being stressed beyond its strength limits. Because the strut 30 is tubular, it is considerably lighter in weight than a solid strut member of the same size.

The cap members 40 and 42 and seat 46 conform with the outer surface of mounting tube 26 and are rigidly clamped thereto by bolts 54 which draw the cap members toward base member 44.

As shown in Figures 3, 4 and 7, there is mounted on opposite end 34 of each strut 30 a stub axle indicated generally at 56. Strut 30 has a reduced end portion 58 (Figures 3 and 4) which fits snugly in a bore 60 extending through the center of axle 56. End 34 of strut 30 is rigidly connected to axle 56 by a weld 62.

Welded on axle 56 at opposite sides of strut 30 are a pair of opposed brake shoe supporting spiders 64 and 66, each having mounted thereon cam actuated brake shoes 68; only one of which is shown in Figure 4, carrying lining 69 which, when the brake is actuated, engages the inner surface of a brake drum 70. Like members (not shown) are mounted in an identical manner in an opposite brake drum 71 (Figure 7).

Brake shoe 68 has a double web 72 pivotally connected at one end by pin 74 to spider 64. The opposite end of web 72 has a roller 76 mounted therein which is biased against an actuating cam 78 by means of a tension spring 80 connected between opposed shoe webs 72. Cam 78 is rigid with a shaft 81 which is journalled in a bushing 82 in spider 64 and in a support member 83 connected by bolts 84 to a U-shaped bracket 85 welded to the top of strut 30 adjacent axle 56.

In identical opposed structure, a shaft 81' is aligned with shaft 81 and journalled in an adjoining support member 83' and the spider 66. A pair of like lever arms 86 and 86' are connected to shafts 81 and 81' by a pair of slack adjusters having adjustment members 88 and 88'. The slack adjusters may take the form shown in U.S. application Serial No. 361,211, filed June 12, 1953.

A U-shaped bifurcated link member 92 (Figure 5) has a base 93 and arms 94 and 94' which are pivotally connected to the respective ends of lever arms 86 and 86' by pins 96 and 96'. A rod 98 has fixed on one end thereof a bifurcated member 100 which is pivotally connected by pin 102 to base 93 of link member 92. The opposite end of rod 98 is connected to a conventional fluid operated brake actuating motor 104 secured to a mounting bracket 106 welded to axle 56. As shown in Figure 4, fluid motor 104 is mounted on the underside of bracket 106 and actuating rod 98 extends through a hole 108 shown in Figure 3.

Referring again to Figure 7, brake drum 70 is rigidly secured by bolts 109 to wheel hub 110 rotatably mounted at spaced points on stub axle 56 by conventional roller bearings 114. Wheel hub 110 is held in place on stub axle 56 by means of a nut 116 threaded on the end of the axle. The hub 110 is provided with a flange 117 to which the wheel disc 118 is secured in a conventional manner by wheel lugs 119. Brake drum 71 is mounted in the same manner as brake drum 70.

In operation of the foregoing braking assembly, fluid motor 104 simultaneously moves levers 86 and 86' to rotate shafts 81 and 81' and the brake shoe actuating cams to urge the brake shoes against the inside surface of the brake drums. By proper adjustment of slack adjusters 88 and 88', the brake shoes can be made to engage their respective brake drums at exactly the same time with the same degree of pressure to assure smooth and uniform braking action on both ground engaging wheels mounted on the strut. As will be understood by all skilled in the art, the braking assemblies on the other struts suspending the trailer 12 are synchronized to provide uniform braking action on all ground engaging wheels.

The present novel strut and stub axle assembly is of such construction that it may be subjected over long periods to normal stress and shock loads as daily encountered on the road. Its somewhat flexible though rigid structure will absorb readily all impact loads under normal conditions without over-stressing the material or producing excessive wear of the parts thereof. The braking action is such that the brake drums of the wheels will exert a couple on the brakes around the axis of rotation resulting in a tendency to lift the rear wheel assemblies upward with regard to the trailer body, causing the latter to move downward. This tendency reduces considerably the pitching and oscillating of the trailer assuring a more comfortable and safer braking action.

This novel strut and stub axle assembly, being a complete unit, is easy to install and to maintain. Initial cost and maintenance costs are cut considerably by the feature of incorporating only one brake actuator for both brakes in each dual wheel assembly.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A suspension assembly comprising a hollow tubular strut; a bracket adapted to connect one end of said strut to a spring torsion bar; a longitudinal bore in an end of said strut, said bracket having a torsion bar receiving socket and an extension projecting away from said socket fitting in said bore, said extension being tubular and having a wall with progressively diminishing cross-sectional thickness toward the end of the extension; a weld rigidly connecting the bracket and strut together; a stub axle having a transverse bore therein, the opposite end of said strut fitting in said bore; and a weld rigidly connecting the axle and strut together.

2. A braking and suspension assembly comprising a hollow tubular strut; a bracket adapted to connect one end of said strut to a spring torsion bar; a telescoping connection between said bracket and an end of said strut; a weld between said bracket and strut rigidly connecting the bracket and strut together; a stub axle adapted to rotatably support a pair of ground engaging wheels and having a transverse aperture intermediate its ends; a telescoping connection between the opposite end of said strut and the aperture in said axle; a weld between said axle and strut rigidly connecting the axle and strut together; and brake assemblies for said ground engaging wheels directly mounted on said axle.

3. A braking and suspension assembly comprising a tubular strut; a bracket adapted to connect one end of said strut to a spring torsion bar; a tubular extension on said bracket having walls which progressively taper in cross-sectional thickness toward the outer end thereof; said tubular extension fitting in an end of said strut; a weld between said bracket and strut rigidly connecting the bracket and strut together; a stub axle having a transverse bore therein; the opposite end of said strut fitting in said bore; a weld between said axle and strut rigidly connecting the axle and strut together; a pair of opposed brake mechanisms mounted on said axle on opposite sides of said strut; a fluid motor mounted on said axle; and a common link means operatively connecting said motor to said brake mechanisms.

4. A combination axle and strut assembly comprising: a stub axle adapted to rotatably support a pair of ground engaging wheels at opposite ends and having a transverse tubular socket intermediate its two ends, a hollow strut having one end telescoped and rigidly secured within said socket, and a torsion spring attachment bracket having a socket portion adapted to receive said spring and a projecting tubular extension telescoped within and rigidly secured to the other end of said strut.

5. A combination axle and strut assembly comprising: a stub axle adapted to rotatably support a pair of ground engaging wheels at opposite ends and having a transverse tubular socket intermediate its two ends; a hollow strut having one end telescoped within and rigidly secured to said axle socket; and torsion spring attachment means including a spring receiving socket and a tubular portion projecting a substantial distance into the other end of said hollow strut said tubular portion being welded to the end of said strut and having side walls of decreasing thickness toward the end within said strut to provide sufficient flexibility for resisting shock loads.

6. A combination axle and strut assembly comprising: a stub axle member with two oppositely disposed stub shafts adapted to rotatably support a pair of ground engaging wheels at opposite ends and having a transverse socket intermediate its two ends; each axle shaft being progressively reduced in cross-section from said transverse socket to its end; a hollow strut having one end disposed in said axle socket and welded to said axle; clamp means comprising a member with a tapered tubular portion projecting a substantial distance into the other end of said hollow strut and welded thereto; a pair of opposed brake shoe and brake shoe actuating mechanism supports welded to said axle at opposite sides of said hollow strut; auxiliary brake shoe actuating mechanism support means welded to said axle intermediate the ends of said axle; and a brake actuating motor support welded to said axle.

7. A combination axle and strut assembly comprising: a stub axle member with two oppositely disposed stub shafts adapted to rotatably support a pair of ground engaging wheels at opposite ends and having a transverse socket intermediate its two ends; each axle shaft being stepped in progressively reduced in cross-section from said transverse socket to its end; spaced bearings on inner and outer stepped portions of said stub shafts; a wheel hub rotatably disposed on said bearings of each said stub shaft; a hollow strut having one end disposed in said axle socket and welded to said axle; clamp means comprising a member with a tapered tubular portion projecting a substantial distance into the other end of said hollow strut and welded thereto; a pair of opposed brake shoe and brake shoe actauting mechanism supports welded to said axle at opposite sides of said hollow strut adjacent the inner ends of each stub shaft; auxiliary brake shoe actuating mechanism support means welded to said axle intermediate the ends of said axle; and a brake actuating motor support welded to said axle.

8. A combination axle and strut assembly as defined in claim 7, wherein a brake drum is non-rotatably secured to each wheel hub; opposed brake shoe sets and cam type brake actuating mechanisms supported by said brake shoe and brake shoe actuating mechanism supports; a motor secured on said motor support; and means providing a short coupling power connection between said motor and said brake actuating mechanisms.

9. In a vehicle, a stub axle, means at opposite ends of the axle for journalling longitudinally spaced ground engaging wheels, a body connected strut rigid at one end with said axle intermediate the wheel journalling means, brake mechanism supports directly rigidly mounted on said axle and disposed on opposite sides of the strut between the strut and the wheel journalling means, the brake mechanism on each support comprising a set of movable brake shoes, a cam for actuating each set and operably connected rotatable cam shaft means extending parallel to the axle, means for journalling said shaft means on a fixed axis parallel to the axle, a fluid pressure motor mounted directly on the axle and having a reciprocable brake mechanism operating rod projecting at right angles to a plane containing the longitudinal axis of the axle, parallel levers on each cam shaft disposed on opposite sides of said shaft journalling means, and a link pivotally connected at opposite ends to said levers and intermediate its ends to said rod.

References Cited in the file of this patent

UNITED STATES PATENTS

| | | |
|---|---|---|
| 693,181 | Spencer | Feb. 11, 1902 |
| 1,265,090 | King | May 7, 1918 |
| 2,459,372 | Fraunfelder | Jan. 18, 1949 |
| 2,635,896 | Tantlinger | Apr. 21, 1953 |
| 2,675,247 | Meng | Apr. 13, 1954 |
| 2,773,699 | Grumman | Dec. 11, 1956 |